Patented May 21, 1940

2,201,321

UNITED STATES PATENT OFFICE 2,201,321

MANUFACTURE OF ABRASIVE ARTICLES

Norman Pierce Robie, Niagara Falls, N. Y., assignor, by mesne assignments, to The Carborundum Company, Niagara Falls, N. Y., a corporation of Delaware No Drawing. Application April 27, 1936, Serial No. 76,597. In Canada October 4, 1935

7 Claims. (Cl. 51—278)

This invention relates to the manufacture of abrasive articles and particularly to such articles bonded by the use of resinous materials. More particularly the invention relates to a method of making abrasive articles wherein there is employed abrasive grains individually coated with resin made up from a mix consisting primarily of the abrasive grain, dry resin bonding material therefor, and a plasticizer for the grain and bond.

This application is a continuation in part of my copending application Serial No. 12,043, filed March 20, 1935.

Resinous materials have been previously used in the bonding of abrasive articles, and plasticizers have been previously used in conjunction with dry resinous material in the bonding of abrasive articles.

Brock in his United States Patent No. 1,537,454 discloses mixing abrasive grains with dry powdered potentially reactive phenolic resin and plasticizing the mixture with a suitable plasticizer such as reactive organic aldehydes, benzaldehyde, furfural, hexoic aldehyde, methyl furfural, etc.

Martin in his United States Patent No. 1,626,246 discloses wetting the abrasive grains with a small amount of a resin solvent such as furfural and mixing powdered resinous binder with the wetted grain.

Kuzmick in his United States Patent No. 1,900,386 and Novotny and Kuzmick in their United States Patent No. 1,924,748 propose the use of benzaldehyde and furfural alcohol, respectively, in similar processes. Webster and Sanford in their United States Patent No. 1,893,117 disclose the use of a neutral non-aqueous liquid such as creosote oil, xylol, etc., in conjunction with a plasticizing agent such as furfural.

All these prior methods rely on the use of relatively expensive solvents. Furthermore the bonding of relatively coarse abrasive grain by the use of the methods employing organic solvents tends to cause bloating and flow of the bond to the bottom of the article during the curing thereof.

It is an object of the present invention to provide a method of bonding abrasive articles wherein the use of expensive organic plasticizing agents is eliminated and wherein the bond has a substantially lessened tendency to bloat and flow during the curing of the article, particularly in the bonding of coarse abrasive grain. Another object of the invention is to provide abrasive grains individually coated with a resin bond which is useful in the production of bonded abrasive articles, such as abrasive wheels, as well as in coated abrasive products such as abrasive belts or flexible abrasive disks.

The invention contemplates the use of aqueous solutions of normally solid resins as plasticizers in the manufacture of abrasive articles employing an organic bond.

A number of natural and synthetic resin bonding agents may be dissolved in water by the use of what will be called, for purposes of this description, "solubilizing" agents, such as weak inorganic alkalis, for example ammonia, borax, etc., and certain alkaline organic materials such as triethanolamine. Certain gum copals such as manila copal may be dissolved in water made alkaline with ammonia. Shellac may also be so dissolved. Certain phenolformaldehyde type condensation products having the phenol replaced wholly or partially by phenol carboxylic acid are soluble in weak borax and sodium carbonate solutions. Certain alkyd resins may be dissolved in ammonia and other aqueous alkaline solutions. The solubility of an alkyd resin in dilute aqueous ammonia depends upon the compositions of the resin and its degree of cure. Many initial condensation products of the glycerin-phthalic anhydride type are readily soluble in dilute aqueous ammonia and form clear, transparent solutions. Many initial condensation products of the glycerin-phthalic anhydride type containing ingredients like glycols, succinic acid, and adipic acid, to impart flexibility to the cured product, are also readily soluble in dilute aqueous ammonia to give clear, transparent solutions.

The resins which may be used in forming the plasticizer for use in the present invention include those which are ordinarily useful as bonding materials, which may be dissolved in water as described above, and which are under normal conditions as to temperature, etc., substantially solid. The use of the term solid herein includes also those resins which may be described as plastic but not readily flowable.

The invention contemplates the use of aqueous solutions of normally solid resins as plasticizers in conjunction with the use of additional dry powdered resin bonding material which may be initially fusible, but heat hardenable, or permanently fusible. In carrying out the invention the abrasive grain and dry bonding material may be intimately mixed and then plasticized with the aqueous resin solution. It may be preferable however to first moisten the abrasive grain with at least a portion of the plasticizer to be used and then mix the dry resin with the wetted grain to form a substantially dry distributable mix wherein the individual grains are coated with dry bonding material. If only a portion of the plasticizer is used to moisten the grain, the remainder may be added to the mix after the addition of the dry bonding material to form a distributable mix wherein the individual grains have an outer coating of a somewhat smooth glassy nature.

The dry resin used in making the mix may be of the same nature as that used in the plasticizer, or it may be an entirely different resin. For example, the plasticizer may contain an alkyd resin whereas the dry resin may be a phenol-formaldehyde condensation product. The dry resin and that in the plasticizer may be selected with reference to each other in accordance with the type of mix desired and the nature of the bond desired in the finished article.

Furthermore the dry resin may be selected with reference to the plasticizer and the plasticizer may be varied with reference to the dry resin to cause the plasticizer to dissolve a substantial proportion of the dry resin used in the mix, or none at all, or a predetermined portion thereof. For example, the plasticizer may be an aqueous ammonia solution of an alkyd resin and the dry resin used in conjunction therewith may be a phenolic type resin substantially insoluble in aqueous ammonia. Or, the plasticizer used may be a saturated solution of an alkyd resin, and the dry resin used in conjunction therewith may be an alkyd resin normally soluble in the aqueous alkaline solution used in the plasticizer, but not soluble in the plasticizer because of its saturated condition. The extent to which the dry resin is dissolved by the plasticizer may therefore be governed by the degree of saturation of the plasticizer. For example, a definite proportion of "solubilizing" agent is required to produce the solution of the resin to be used in the plasticizer. By controlling the amount of "solubilizing" material, if any, in excess of the amount required to form the plasticizing agent, the extent to which it dissolves the dry resin may be selectively controlled.

It is evident that many variations of the present invention are possible in selecting the proportion and order of mixing of the ingredients of the mix, in selecting the types of resin to be used in the plasticizer and as the dry resin, and in controlling the extent to which the plasticizer is a solvent for the dry resin. The invention therefore is not to be limited to the specific embodiments given above or below but is to be construed to include these and equivalent variations and to be limited only by the appended claims.

The mix made according to the present invention is granular, substantially dry to the touch and easily distributable. Where it is employed in the manufacture of bonded abrasive articles such as abrasive wheels it may be readily cold molded and cured under the conditions appropriate to the resin used to produce articles of great strength. When exposed to the atmosphere the mix will dry in a short time to give a mass of individually separate abrasive grains, coated with non-tacky films of resinous bonding material. In such condition the grains may be hot pressed to form bonded articles or may be handled and stored the same as ordinary uncoated abrasive grain. In this condition the grains are particularly adapted for use in the production of coated abrasive articles such as abrasive paper. For example they may be applied directly to a suitable backing which is treated to cause adhesion of the resin coating to the backing, methods for which are described and claimed in a copending application Serial No. 703,831, filed December 23, 1933; or they may be distributed over a backing which has been previously coated with a liquid resinous material as described in copending application Serial No. 693,395, filed October 12, 1933. The coated grains of my invention have been found to be especially suitable for use in these methods because the resinous coatings are firm and non-coherent and yet they are sufficiently soluble and fusible so that they are readily made adherent to the backing material or the resinous coating on the backing.

In making abrasive wheels, the grains may be put into a mold and hot pressed or the dry grain may be plasticized, e. g., with a small amount of aqueous resin solution or aqueous alkaline solution, and cold pressed to form the desired article. Depending upon the order of addition of the ingredients to the mix, the proportion of dry resin dissolved by the plasticizer, and the viscosity of the plasticizer, the coating on the grain will vary from a rough opaque appearance to one of a smooth glassy nature. Aside from the tendency of the plasticizer in some cases to dissolve a portion of the dry resin bond, the plasticizer apparently tends to creep around particles of the coating of dry bond and enclose it in a glassy shell. The glassy appearance of the coating on the grain made according to this modification of the present invention may be due to the more or less solvent action of the plasticizer on the dry resin or it may indicate a shell of a plurality of particles of undissolved dry resin, individually enclosed and cemented together by the solidified plasticizer. By certain modifications of the invention grain having a dull opaque coating may be obtained, probably due to a plurality of particles merely cemented to the grains.

The grain produced by the method of the invention may be handled without disturbing the coating and stored indefinitely. The invention thus includes as an intermediate product coated abrasive from which articles may be readily formed.

The invention will now be further described with reference to specific examples. Here again it is to be understood that these examples merely illustrate certain embodiments of the invention which is capable of numerous other embodiments and is to be limited only by the appended claims.

*Example I.*—A plasticizer may be made of the following composition: 32 parts of a somewhat soft, plastic, deformable but not substantially flowable A stage glycerin-phthalic anhydride type resin which on curing remains flexible due to the presence of constituents such as glycols, succinic acid and adipic acid; 4 parts of concentrated ammonia solution of a specific gravity of .90; and 36 parts of water. 72 grams of this resin solution may be used to moisten 1760 grams of 80 grit fused alumina abrasive grain. To this mix may be added, while mixing, 208 grams of finely pulverized heat-curing glycerin-phthalic anhydride resin.

This mixture will be comparatively wet and may be spread out to dry, for example, for an hour. A mixture of uniformly coated abrasive grains will be obtained which may be easily screened and distributed in molds. This grain may be stored for long periods. For example grain coated according to this example has been stored for two weeks without acquiring loose bond or coalescing to a hard lump although it was in condition to be cold pressed without the addition of any plasticizer. The water and ammonia evaporated leaving uniform coatings of resin cemented to the abrasive grains.

Abrasive wheels and other articles may be made of grains coated according to this example by cold or hot pressing. For example, they may be pressed at 2000 lbs. per sq. in. between hollow plates containing 125 lbs. steam pressure for 20 minutes. The pressed article may then be cured as follows: 24 hours at 150° F.; 24 hours at 200° F.; 24 hours at 250° F.; 24 hours at 300° F. and 72 hours at 350° F.

An abrasive bar 7" x 1" square made according to this example had a modulus of rupture of 6450 lbs. per sq. in.

*Example II.*—A plasticizer may be made of the following ingredients: 30 parts of an A stage pulverized rigid-curing glycerin-phthalic anhydride resin; 6 parts of concentrated ammonia, specific gravity .90; and 54 parts of water. 90 grams of this plasticizer may be used to moisten 1640 grams of 20 mesh silicon carbide abrasive grain. These ingredients are thoroughly mixed and to them while mixing may be added 230 grams of finely pulverized A stage glycerin-phthalic anhydride resin. A uniformly coated abrasive mix results which is easy to screen and distribute in the molds. The mix may be pressed into abrasive wheels and other articles and cured as in Example I. The modulus of rupture of a test piece so prepared and cured was 5750 lbs. per sq. in.

*Example III.*—A plasticizer may be made of the following ingredients: 30 parts of a high-acid saturated alkyd resin having a melting point of 72° to 81° C.; 6 parts of concentrated aqua ammonia, specific gravity .90; and 24 parts of water. 60 grams of this plasticizer may be used to moisten 1760 grams of 80 mesh fused alumina abrasive grain. These ingredients are thoroughly mixed and to them, while mixing, may be added 220 grams of finely powdered heat hardening phenol-formaldehyde condensation product resin. A mix made according to this example will be very distributable and easily screened into molds for pressing. The mix may be either hot or cold pressed into abrasive wheels and other articles. For example, it may be cold pressed at 2000 lbs. per sq. in. and the article cured by bringing it to 350° F. in five hours and holding it at that temperature for 16 hours.

Figure eight briquettes made according to this example had a tensile strength of 2420 lbs. per sq. in.

*Example IV.*—The plasticizer need not be prepared in advance, but can be produced upon the grains themselves. 1760 parts of 80 grit fused alumina grain may be wet with 100 parts of ammonia containing 10% of concentrated ammonia, specific gravity .90. The wetted grain may then be mixed with 30 parts of heat hardening glycerin-phthalic anhydride resin, 200 mesh and finer, which is soluble in the ammonia. These ingredients are mixed thoroughly and then 210 parts of an A stage finely powdered heat hardening phenol-formaldehyde resin, not appreciably soluble in the ammonia, may be intimately mixed with the ingredients already mixed. This method produces a substantially dry distributable mix which may be either hot or cold pressed into wheels or other articles and cured, as in Example III. A test piece so made and cured had a dry tensile strength of 1890 lbs. per sq. in.

As a variation of this method the soluble resin and the substantially insoluble resin may be mixed before admixture with the wetted grain. 210 grams of finely powdered phenol-formaldehyde condensation product and 30 grams of an A stage glycerin-phthalic anhydride type resin soluble in dilute aqua ammonia may be intimately mixed and screened through a 197 mesh screen. The mixture of resins may then be intimately mixed with 1760 grams of 80 mesh fused alumina abrasive grain which has been wetted with 35 cc. of ammonia solution containing 10% of concentrated aqua ammonia, specific gravity .90. A mix made by this method is substantially dry and distributable but abrasive articles made of it in accordance with Example III, exhibited lower strengths than those made by the previous methods.

Neither of these methods however is preferable to the methods wherein the plasticizer is formed before admixture with the grain. A mix prepared using the same amount of a phenolic resin bond and abrasive grain will produce articles of greater strength when the grain is first plasticized with a solution of the glycerin-phthalic anhydride resin. 1760 grams of grain may be plasticized with 90 grams of a resin solution prepared by intimately mixing 30 parts of an A stage heat-hardenable glycerin-phthalic anhydride resin, 6 parts of concentrated ammonia, .90 specific gravity, and 54 parts of water. A mix made according to this method may be pressed into abrasive wheels or other articles and cured, as in Example III. A test piece so prepared had a tensile strength of 1980 lbs. per sq. in.

*Example V.*—The present method is not limited to the use of synthetic resins but may be applied to the manufacture of abrasive articles bonded with certain natural resins. A water solution of shellac may be prepared by boiling 57 parts of orange shellac, 14 parts of borax and 175 parts of water. 80 parts of this shellac solution may be used to plasticize 880 parts of 36 grit fused alumina abrasive grain. To the wetted grain 100 parts orange shellac of a size which will pass through a 100 mesh screen may be added and intimately admixed. This method produces a distributable mix which dries out rapidly, leaving a mix easy to screen and distribute in molds. When partially dry the mix has sufficient cohesiveness for making abrasive wheels and other articles by cold pressing and when dry by hot pressing or cold pressing after being dampened with a little of the plasticizer. For example such an article may be made by hot pressing at 2000 lbs. per sq. in. and curing as in Example I. A test piece so made exhibited a tensile strength of 911 lbs. per sq. in.

*Example VI.*—The aqueous resin solution may be used to plasticize a mixture of the relatively insoluble resin bond and the abrasive grain. 1760 parts of 80 grit fused alumina abrasive grain and 220 parts of finely powdered A stage phenol-formaldehyde resin may be intimately mixed with a plasticizer containing 30 parts of high acid glycerin-phthalic anhydride resin and 50 parts of aqueous ammonia containing 20% or concentrated ammonia, specific gravity .90. This method produces an easily distributable relatively dry mix which may be cold pressed before being completely dried; or allowed to dry and hot pressed or cold pressed with the addition of a little plasticizer. For example a wheel may be made of this mix by cold pressing at 2000 lbs. per sq. in. before the mix is permitted to dry, and cured as in Example III. A test piece so made exhibited a dry tensile strength of 1915 lbs. per sq. in.

*Example VII.*—Abrasive grains coated according to Example VI and allowed to dry may be employed in the manufacture of flexible abrasive disks by applying the grains in a substantially single layer to a suitable backing material which has been preliminarily coated with a liquid resinous material. The backing may be a combination of cloth and vulcanized fiber which have been combined with a resinous adhesive to form a unitary structure. The liquid resinous material may be a normally liquid phenol-formaldehyde condensation product which is heat-reactive and solidifies when heated. The liquid resin may contain an inert filler such as pulverized flint.

After the coated abrasive grains have been applied to the resin coated side of the backing the article may be heated to cause the resin coatings on the grains to weld to the resin coating on the backing and to harden the resins. Abrasive grains coated in accordance with the method of my invention are particularly well adapted for use in making such coated articles. The resin coatings on the grains are hard and non-tacky, and hence the grains are readily applied to the backing as by feeding from a hopper in the manner commonly used in making sandpaper and yet the resin coatings are readily fusible and tend to flow from the upper exposed surfaces of the grains when the article is cured. Substantially all the resin is thereby made available as a bond for attaching the grains to the backing and at the same time the exposed surfaces of the grains are left with the sharpness and hardness of the abrasive material rather than covered with a smooth layer of hardened resin.

A most difficult type of resin bonded wheel to produce satisfactorily is that which comprises a relatively coarse abrasive grain and a high percentage of bond. The difficulties attendant upon the manufacture of such wheels are apparently due to the fact that a large amount of pulverized resin is distributed over a small amount of abrasive surface area, therefore relatively more organic plasticizer is necessary to cause the thicker coatings of pulverized resin to stick to the abrasive surface. Such mixes, during the curing operation, are susceptible to bloating and flow of the bond to the bottom of the article. This objectionable feature is apparently due in part to some of the organic plasticizer being retained in the mix even after prolonged drying. In connection with the present invention it has been discovered that the water used in the plasticizer has much less tendency to remain in the mix than the organic plasticizers used heretofore. Consequently mixes made according to the present invention are much less susceptible to bloating, slumping and bond flow than those made according to previous methods.

In comparing the advantages of the method of the present invention with those of one of the heretofore most widely practiced methods of the prior art, mixes were made by each method and compared as to workability, slumping and bond flow. For the mix according to the present invention, 1780 grams of 14 mesh fused alumina abrasive grain were plasticized with a resin solution comprising 27 grams of solid A stage heat-hardenable glycerin-phthalic anhydride resin dissolved in 93 grams of dilute aqua ammonia containing 20% concentrated ammonia, .9 specific gravity. These ingredients were mixed thoroughly and to them, while mixing, were added 193 grams of finely powdered A stage heat-hardenable phenol-formaldehyde type resin not appreciably soluble in dilute aqua ammonia. For the prior art mix, 1780 grams of the same abrasive grain and 220 grams of the same phenol formaldehyde resin were used. The grain was plasticized with 27 grams of an organic solvent plasticizer comprising a mixture of furfural and cresol, and the dry resin was then intimately mixed with the wetted grain.

The mix made according to the present invention was far superior to the one made according to the prior art as to workability and uniformity of coating of the individual granules.

To compare their susceptibility to bloating, 15 molded articles were made of the two mixes by cold pressing. Two articles of each mix were subjected suddenly to 350° F. The one made according to the present invention slumped down due to the sudden fusion of the resin. The prior art type article not only fused and sagged, but bloated to twice the size of the other mix.

Articles of each type of mix were given a less drastic treatment by heating them for 16 hours at 150° F. and then suddenly heating to 350° F. for 16 hours. The articles made according to the method of the prior art sagged somewhat and the bond noticeably ran to the bottom, whereas the articles made according to the present invention showed neither of these defects.

Articles of each type of mix were given a still less drastic type of cure by heating for 16 hours at 150° F., raising the temperature in 7 hours to 350° F. and holding that temperature for 16 hours. The articles made according to the present invention did not slump and showed no signs of bond flow. The articles made according to the method of the prior art slumped slightly and the bond flowed to the bottom noticeably.

It will be noted that these differences obtained in spite of the fact that the mix made according to the present invention had about three times the amount of liquid plasticizer as the prior art mix.

The superior qualities of the mix made according to the present invention probably are due to the fact that the aqua ammonia used was a solvent for only ⅛ of the total bond, the resulting solution being used as an adhesive to adhere the remainder of the non-soluble resin to the abrasive surface. Because the aqua ammonia is a solvent for only a small portion of the resin, it is easily driven off without bloating and lowering the flowing temperature of the bond. When organic solvents are used the solvent probably penetrates the resin particles causing them to cohere, making them retain some of the solvent even after drying which causes bloating and lowering of the flow temperature of the bond.

The mix made according to the present invention is suitable for cold pressing since it is cohesive when damp. On drying, for example overnight, the mix becomes non-cohesive although the resin particles remain thoroughly coated. Since such a mix contains practically no residual plasticizer or solvent, it is very suitable for hot pressing or for making coated abrasive articles such as abrasive paper or other abrasive articles containing a backing and a thin layer of grains thereon.

Certain specific examples of the invention have been described, but it is obvious that many modifications thereof are possible. Various natural and synthetic resins may be used as the alkaline water soluble resin, or the insoluble resin. Various fillers, thermoplastic resins and modifying agents may be added to the mixture. Other abrasives such as garnet, flint, corundum and emery may be used. These modifications are apparent from the foregoing description and the invention is to be limited only by the accompanying claims.

By "alkyd resin" and "phenolic resin" as used throughout this application is meant, in accordance with commercial practice, not only the reaction products of the resinifying reactions but also such products containing various added modifying agents.

By "fusible resin" as used in the claims of this application is meant a resin which is either permanently fusible or is fusible prior to complete curing.

I claim:

1. The method of making abrasive articles which comprises forming a solution of normally solid resin in dilute aqua ammonia and commingling the said solution with abrasive grain and powdered fusible resin insoluble in aqua ammonia, to form a granular mix wherein the resin adheres to the abrasive grain, molding the mix to a desired form, and heating the molded article.

2. The method of producing non-tacky resinous coatings upon the individual grains of a mass composed of a plurality of abrasive grains which comprises forming a solution of normally solid resin in a water solution of an alkaline substance, commingling the said solution with abrasive grains and powdered fusible resin to produce a granular mix wherein the resin adheres to and individually coats the abrasive grains, and drying the thus produced resin coated grains.

3. In the manufacture of abrasive articles, the steps comprising forming a solution of normally solid resin by dissolving said resin in water containing an alkaline solubilizing agent for the resin, commingling said resin solution with abrasive grains and powdered fusible resin to produce a granular mass of abrasive grains individually coated with resin bond, fabricating an article containing the resin-coated grains, and heating the article.

4. The method of making abrasive articles which comprises forming a solution of normally solid resin in a water solution of an alkaline material, commingling said resin solution with abrasive grains and powdered fusible resin to form a granular mix wherein the resin adheres to the abrasive grains, molding the mix to a desired form, and heating the molded article.

5. The method of making abrasive articles which comprises dissolving normally solid resin in a water solution of an alkaline material, commingling the resin solution with abrasive grains and powdered fusible resin to form a mass of distinct grains individually coated with resin, coating a backing with a resinous adhesive, applying a layer of the resin-coated grains to the adhesive-coated backing, and heating the thus-coated backing.

6. As a novel article of manufacture, abrasive grains having resinous coatings on the surfaces thereof obtained by commingling said grains with a solution of normally solid resin in a water solution of an alkaline substance and powdered fusible resin.

7. In the production of abrasive grains individually covered with a resinous coating, the steps which comprise forming a solution of normally solid resin in water containing an alkaline solubilizing agent for the resin, wetting abrasive grain with said solution, mixing the wetted grain with powdered fusible resin capable of being made soluble in water by the said agent whereby at least a portion of the said powdered resin is dissolved in the solution on the grain, and controlling the amount of resin dissolved by selectively regulating the amount of the said alkaline solubilizing agent in the water in excess of the amount required to produce the solution of the first mentioned resin.

NORMAN PIERCE ROBIE.